Nov. 14, 1933.   E. A. SPERRY, JR., ET AL   1,934,774
GYRO VERTICAL
Filed Dec. 14, 1929   2 Sheets-Sheet 2
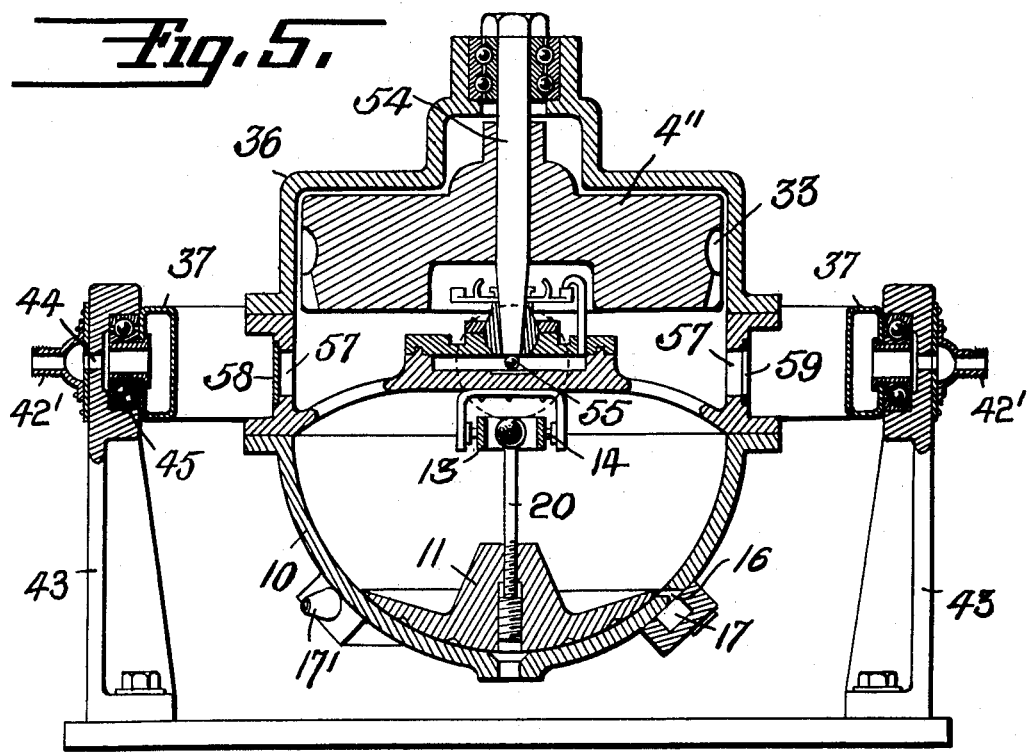
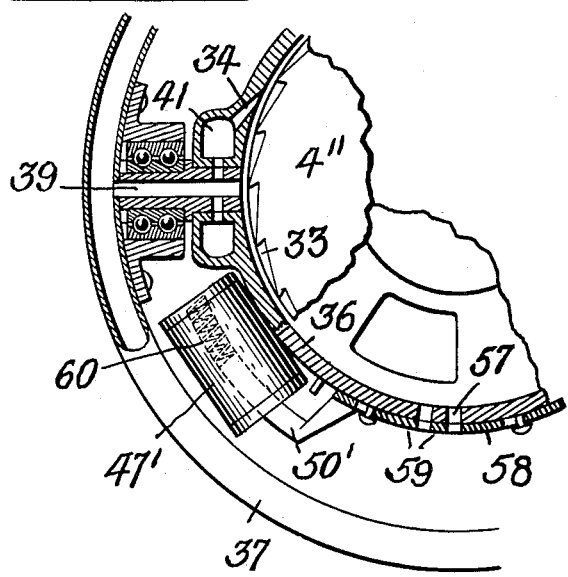
INVENTORS
ELMER A. SPERRY, JR.
LESLIE F. CARTER
BY
Herbert H. Thompson
ATTORNEY.

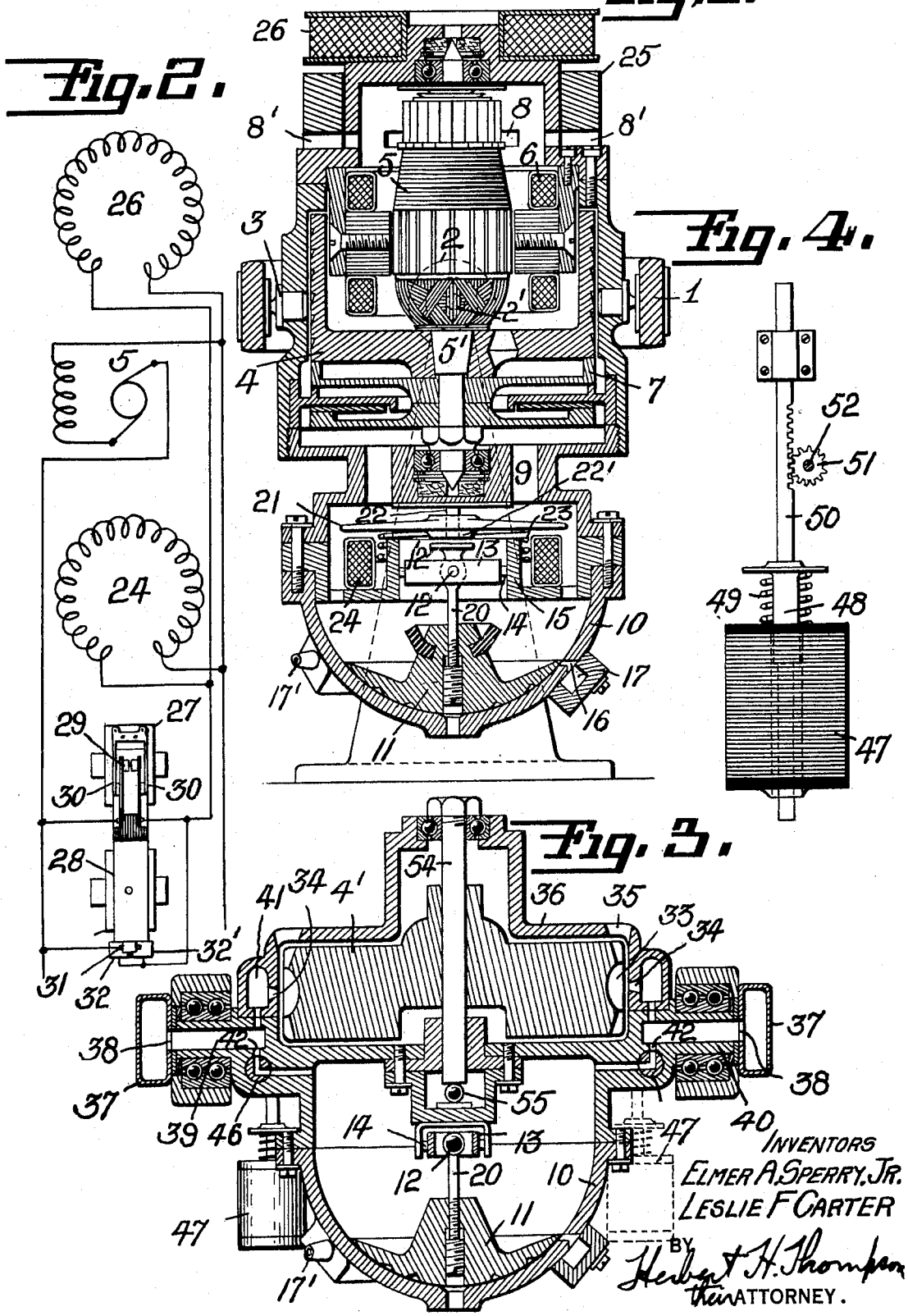

Patented Nov. 14, 1933

1,934,774

UNITED STATES PATENT OFFICE 1,934,774

GYRO VERTICAL

Elmer A. Sperry, Jr., Brooklyn, N. Y., and Leslie F. Carter, Leonia, N. J.; said Sperry, Jr., assignor to Sperry Gyroscope Company, Inc., Brooklyn, N. Y., a corporation of New York, and said Carter assignor, by mesne assignments, to Sperry Products, Inc., Brooklyn, N. Y., a corporation of New York Application December 14, 1929
Serial No. 414,022

12 Claims. (Cl. 74—78)

This invention relates to gyro verticals, or in other words, gyroscopic apparatus adapted to maintain fixed vertical and horizontal planes with respect to the earth's surface. In such apparatus it is necessary, of course, to have some form of gravitational control. Usually such control is brought about by making the apparatus pendulous, and usually some form of damping or erecting means is provided in addition for bringing the same to rest in the vertical position, the damping means also acting under the influence of gravity.

According to our invention, we propose to eliminate one of the above mentioned controls by combining the two, i. e., the gravitational and damping in one element or operation which we call an erecting means, but whether the two are combined or not we further propose to provide a means for eliminating all gravitational control when the craft on which the gyroscope is mounted is accelerating, i. e., is changing either course or speed. By providing means for cutting out the gravitational controls during this time, we have succeeded in producing a very accurate gyro vertical which may be used as a baseline on airplanes, trains, ships or other vehicles, and virtually regardless of the sharp turns and quick starts and stops.

Our invention is illustrated as applied to the type of gyroscope shown in the patent to M. F. Bates, No. 1,518,892, dated December 9, 1924, but it will be understood that our invention is applicable to other types of gyroscopes.

Referring to the drawings in which several preferred forms of the invention are shown, Fig. 1 is a vertical section through a gyro vertical of the electrically driven type.

Fig. 2 is a wiring diagram showing how the gyro is controlled from an acceleration detecting means.

Fig. 3 is a vertical section through an air driven type of gyro vertical.

Fig 4 is a detail of the automatic means for shutting off the air supply to the erecting or damping means.

Fig. 5 is a vertical section through a still further modification of an air driven type gyro vertical in which a by-pass is provided for the air supplied to the damping or erecting means. Fig. 6 is a horizontal section of the same.

In Fig. 1 the gyroscope is supported universally in the usual gimbal ring 1, which is journalled in the fixed brackets 2 on an axis 2' at right angles to the pivots 3 which support the gyro casing in the gimbal ring. In this form of the invention the gyro rotor 4 is driven by an electric motor 5, the rotor being mounted on the shaft 5' of the motor and extending upwardly over a part of the field 6. A two-stage air impeller 7 is also secured to shaft 5' which serves to draw in the air through slots 8 in the top of the casing down through the motor to cool the same, and which discharges air through openings 9 into the lower hemispherical portion 10 of the casing. Within this portion of the casing is universally pivoted an arc-shaped pendulum 11. Said pendulum is shown as pivoted on an axis in gimbal ring 13 which in turn is pivoted on axis 14 within the bracket 15.

A plurality of slots 16 are provided in the casing at or near the upper periphery of the pendulum 11 so that when the pendulum and casing are vertically aligned, the slots are all closed or open slightly the same amount. When, however, the main gyroscope and the pendulum become inclined relatively, one or more of the slots is uncovered more than the others, thus creating a differential air flow through the same. The slots merge into horizontally directed channels 17 open at one end to the atmosphere to form nozzles 17' so that when air issues from the same a torque is exerted about a horizontal axis which is at right angles to the axis of inclination. The structure so far described is similar to that described in the aforementioned Bates patent.

As stated above, the device may be made pendulous in its gimbal supports 2'—3, but in the preferred form of our invention we mount the gyroscope as nearly in neutral equilibrium as practicable. In both cases the auxiliary pendulum 11, through the air blasts, exerts an erecting torque about the horizontal axis on the gyroscope, such as tends to align the gyroscope with the pendulum 11. Where the gyroscope is pendulously mounted, such an erecting torque acting out of phase with the gravitational torque on the gyroscope serves merely to damp the oscillations. Where the gyroscope is mounted in neutral equilibrium, the erecting torque exerted by the air jets is preferably made quite strong so as to return the gyroscope to vertical without the aid of the direct action of gravity on the gyroscope. This achieves the important result that the resultant precession of the gyroscope is in a direction to eliminate the tilt and hence, instead of setting up an oscillation as does a pendulous factor, the tilt is taken out directly without causing an oscillation. Also, the air jets act to average out the short period oscillations of the little pendulum 11 so that the temporary oscillations or inclination of the same does not affect the gyroscope. In addition, the air slots 16 are preferably made narrow in the direction of movement of the pendulum so that the maximum torque is exerted for small inclinations. This has the advantage over securing the equivalent erecting couple by making the gyro pendulous, in that, if enough pendulosity is used to give the gyro the same ability to settle vertical, lateral acceleration forces will start large oscillations, while if small pendulosity is used, the gyro will never settle on account of the small gravity couple when nearly vertical.

Where, however, the vehicle turns for an appreciable time, such as in making an 180° turn and where it is accelerating for some time, even the air jets would exert a torque on the gyro tending to displace the same from the vertical and to line it up with the little pendulum. By designing the jets so that the rate of precession is comparatively slow, the effect of such turns on the gyroscope may be made very small, i. e., negligible for the average conditions. In order to secure the utmost accuracy, however, we may also provide a means to prevent also any undesirable action due to this cause. In the form shown in Figs. 1 and 2, means are provided to centralize and lock the little pendulum during such period of acceleration so that the little pendulum is maintained in line with the gyroscope. At the same time we provide means to prevent such locking operation from changing the pendulous balance of the gyroscope as a whole.

For the above purposes, we mount above the rod 20 supporting the pendulum, a plate 21 which is slidable on a stem 22 and normally maintained in the raised position by a spring 23. Below said plate we mount a winding 24 which forms with the extension 15 an electro-magnet, which upon being excited draws down the plate 21 so that the hub 22' thereof engages flat surface 12' on top of stem 20, thus locking the pendulum 11 in its vertical or centralized position within the gyroscopic device. In such position no torque will be exerted by the air jets. When the pendulum is thus locked to the gyroscope, the center of gravity of the gyroscope will be lowered with respect to the pivots 3 and 2'. To prevent this, we provide an annular weight 25 slidably mounted on the top of the gyro casing, which weight is drawn upwardly by electro-magnet 26 at the same time that the pendulum is locked. Said weight is shown as provided with air passages 8' which align with the passages 8 in the gyro case.

As a means for detecting both change of speed and course of the vehicle, we prefer to use the gyroscopic device disclosed in the copending application of Leslie F. Carter, one of the joint inventors, Serial No. 416,989, filed December 27, 1929, for Grade indicators. Such a device employs two small gyroscopes, one of which 27 is mounted to detect turn and the other 28 to detect change of speed. When the vehicle turns, the spring contacts 29, normally biased in an open position, are closed by the fork 30 on the gyroscope, contacting with one or the other of the spring arms. This excites both electro-magnets 24 and 26 thus temporarily paralyzing the erecting means while maintaining the balance of the gyroscope. Also, when the vehicle changes speed, precession of the gyroscope 28 will move the trolley 31 attached thereto on to one or the other of live segments 32—32' thus exciting the magnets as before.

In Fig. 3 the rotor 4' is provided with buckets or blades 33 in the periphery thereof so as to be driven by air jets emerging from nozzles 34 in the casing, the air in this instance escaping through holes 35 in the top of the casing 36. The rotor 4' is mounted on a shaft 54 journalled at its upper end in the casing 36 and supported at its lower end in anti-friction thrust bearing 55. Air is shown as led into the gyroscope from a hollow gimbal ring 37 which has interior openings at 38 leading into passages 39 in the trunnions 40 of the gyro-casing which are journalled in bearings. Said passage communicates with chambers 41 in the gyro casing, which in turn communicate with the aforesaid nozzles 34 (see Fig. 6). Air is introduced into said hollow gimbal ring from hose connection 42' on standards 43 (see Fig. 5), the air passing through opening 44 through the standard and through the trunnion, secured to the ring 37 and journalled in bearing 45.

A portion of said incoming air is preferably made use of for erecting the gyroscope. To this end the air is led downwardly from the passage 39 through a small bore or bores 42 into the hemispherical chamber 10 enclosing pendulum 11. In order to temporarily render the erecting means inoperative, we provide shut-off valves 46 in each of the bores 42. To operate said valves, we have shown solenoids 47 mounted on the gyro casing and having plungers 48 normally maintained raised by springs 49. Each of said plungers is attached to a rack bar 50 which meshes with the pinion 51 mounted on stem 52 of the rotary shut-off valve so that when the solenoid is excited, the valve is rotated to shut off the air supply. Said solenoid may be operated from the turn indicator contact of Fig. 2 or otherwise just as are solenoids 24 and 26.

The form shown in Fig. 5 is also air driven as in Fig. 3, the gimbal mounting and method of leading in the air suply to the rotor being the same. Instead, however, of discharging the air used in the rotor directly into the atmosphere, we discharge the air downwardly into the hemispherical lower part 10, thus using the same air also for exerting the erecting torque. In this form also, instead of shutting off the air supply to the erecting means, during change of speed or course, we provide a by-pass for exhausting the air within the chamber 10 to the atmosphere and thus avoid building up of any pressure in the chamber. This may be accomplished by providing a plurality of vertical slots 57 in the casing 36 which are normally closed by an arcuate slide 58. Said slide has slots 59, which, when moved into alignment with slots 57 (as shown in Fig. 6), furnish by-pass openings for the air. When, however, said slide is thrown to the right in this figure, the slots are closed and the erecting device again rendered operative. For operating said slide, there is shown a solenoid 47' mounted on the gyro casing and in which the core 50' is normally maintained in the outermost position by spring 60. When, however, the solenoid is excited by contacts on the turn indicator of Fig. 2 or otherwise, the core is drawn inwardly, thus aligning slots 59 and 57 and opening the by-pass.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a gyro vertical for moving vehicles, the combination with the universally supported gyroscope, of a pendulous means pivoted thereon, means controlled thereby whereby an erecting torque is exerted on the gyroscope, means responsive to acceleration of the vehicle, means brought into action by said last named means for temporarily preventing the erecting torque which would otherwise be exerted on the gyroscope by said pendulous means from being so exerted during such acceleration.

2. In a gyro vertical for moving vehicles, the combination with the universally supported gyroscope, of a pendulous means pivotally mounted thereon, oppositely positioned airports controlled thereby, means for supplying air thereto for exerting an erecting torque on the gyroscope, and means brought into action by acceleration of the vehicle for temporarily rendering said erecting torque substantially ineffective.

3. In a gyro vertical for aircraft, a gyroscope, including means for supporting the same on horizontal axes in neutral equilibrium and with a normally vertical spinning axis, a pendulum pivotally supported on the gyroscope, oppositely positoned air ports controlled thereby, and means for supplying air thereto for exerting a torque on the gyroscope at an angle to the angle of relative inclination between the same and said pendulum whereby the gyroscope is directly restored to the vertical without any direct gravitational control.

4. In a gyro vertical, the combination with the gyro rotor and rotor bearing casing enclosing the same, and means for pivotally supporting said casing on horizontal axes in substantially neutral equilibrium with the spinning axis of said rotor normally vertical, of air jets leading from without the casing for spinning the rotor within the casing, pendulous means universally mounted by the casing, and air jets normally equally partially opened by said pendulous means and leading from within to without the casing through which the air used to spin the gyroscope escapes whereby the gyroscope is directly restored to the vertical without direct gravitational control.

5. In a gyro vertical for moving vehicles, the combination with the gyroscope mounted universally in substantially neutral equilibrium, a pendulum universally pivoted thereon, means for temporarily locking said penduum in its centralized position, and means responsive to acceleration of the vehicle for bringing said locking means into operation.

6. In a gyro vertical for moving vehicles, the combination with the gyroscope mounted universally in substantially neutral equilibrium, a pendulum universally pivoted thereon, means for temporarily locking said penduum in its centralized position, means for raising the center of gravity of said gyroscope, and means responsive to acceleration of the vehicle for simultaneously bringing said locking means and said raising means into operation.

7. In a gyro vertical, the combination with the gyro rotor and rotor bearing casing enclosing the same, and means for pivotally supporting said casing on horizontal axes in substantially neutral equilibrium with the spinning axis of said rotor normally vertical, of air jets leading from without the casing for spinning the rotor within the casing, means for supplying air thereto, a pendulum pivotally mounted within the casing, air jets normally equally partially opened by said pendulum and leading from within to without the casing through which the air used to spin the gyroscope escapes, and means for temporarily permitting at least some of said air to escape from the casing without passing through said last-named jets.

8. In a gyro vertical for aircraft, a gyroscope including means for supporting the same on horizontal axes in substantially neutral equilibrium and with a normally vertical rotor axis, a pendulum pivotally supported on said gyroscope, differential air ports controlled thereby by means of which a torque is exerted on the gyroscope when supplied with air, at an angle to the angle of relative inclination between the same and said pendulum whereby the gyroscope is directly restored to the vertical, and means for temporarily reducing the torque which would otherwise be exerted.

9. In a gyro vertical for aircraft, a gyroscope having a rotor and a closed casing therefor and including means for supporting the same for oscillation about horizontal axes and with a normally vertical rotor axis, air jets leading from without the casing for spinning the rotor within the casing, pendulous means pivoted for oscillation about both horizontal axes within the casing, air jets normally equally partially opened by said pendulous means and leading from within to without the casing through which the air used to spin the rotor escapes, and means for temporarily permitting some at least of said air to escape without passing through said jets.

10. In a gyro vertical for aircraft, a gyroscope having a rotor and a closed casing therefor and including means for supporting the same for oscillation about horizontal axes and with a normally vertical rotor axis, air jets leading from without the casing for spinning the rotor within the casing, pendulous means pivoted for oscillation about two horizontal axes within the casing, air jets normally equally partially opened by said pendulous means and leading from within to without the casing through which the air used to spin the rotor escapes, means responsive to lateral acceleration pressures, and means brought into action thereby for bypassing some of said air around said jets.

11. In a gyro vertical for moving vehicles, the combination with the universally supported gyroscope, of a pendulous means pivotally mounted thereon, oppositely positioned air ports controlled thereby, means for supplying air thereto for exerting an erecting torque on the gyroscope, and means brought into action by acceleration of the vehicle for temporarily cutting off said air supply.

12. In a gyro vertical for moving vehicles, the combination with the universally supported gyroscope, of a pendulous means pivotally mounted thereon, oppositely positioned air ports controlled thereby, means for supplying air thereto for exerting an erecting torque on the gyroscope, and means brought into action by acceleration of the vehicle for temporarily locking said pendulous means to the gyroscope whereby relative inclination of the same is prevented during such acceleration.

ELMER A. SPERRY, JR.
LESLIE F. CARTER.